United States Patent [19]

Patridge

[11] Patent Number: 5,427,217
[45] Date of Patent: Jun. 27, 1995

[54] STEERING CLUTCH BRAKE ASSEMBLY
[75] Inventor: A. Gary Patridge, Advance, N.C.
[73] Assignee: Hoffco, Inc., Richmond, Ind.
[21] Appl. No.: 88,784
[22] Filed: Jul. 8, 1993
[51] Int. Cl.[6] .................... F16D 67/02; A01D 69/00; B62D 11/08
[52] U.S. Cl. ................ 192/13 R; 192/18 R; 56/11.3; 56/11.5; 180/6.2
[58] Field of Search .............. 192/12 R, 13 R, 14, 192/15, 16, 18 R; 56/10.8, 11.3, 11.4, 11.5, 11.7, 11.8; 180/6.2, 19.3

[56] References Cited

U.S. PATENT DOCUMENTS

| | | |
|---|---|---|
| 1,474,742 | 11/1923 | Turnbull . |
| 1,774,451 | 8/1930 | Norelius . |
| 2,105,680 | 1/1938 | Weiss ................ 180/6.2 |
| 2,585,315 | 2/1952 | Herman . |
| 2,611,442 | 9/1952 | Thomas . |
| 2,696,705 | 12/1954 | Greber ................ 56/11.5 |
| 2,705,859 | 4/1955 | Burg . |
| 2,845,818 | 8/1958 | Siljander . |
| 2,903,108 | 9/1959 | Ochtman . |
| 3,055,445 | 9/1962 | Mendez et al. . |
| 3,343,621 | 9/1967 | Van Doorne . |
| 3,420,343 | 1/1969 | Stiepel . |
| 3,679,015 | 7/1972 | Shriver . |
| 3,680,670 | 8/1972 | Hansen . |
| 3,811,524 | 5/1974 | Aldred . |
| 4,377,224 | 3/1983 | Takata et al. . |
| 4,418,808 | 12/1983 | Nagai . |
| 4,858,739 | 8/1989 | Nemoto . |
| 4,895,210 | 1/1990 | Witzel . |
| 5,018,592 | 5/1992 | Buchdrucker . |
| 5,146,735 | 9/1992 | McDonner . |

OTHER PUBLICATIONS

*Design Practices–Passenger Car Automatic Transmission*, SAE Advances in Engineering Series #5, 2nd ed. Warrendale, Pa., SAE, 1973–p. 116.

*Primary Examiner*—Richard M. Lorence
*Attorney, Agent, or Firm*—Barnes & Thornburg

[57] ABSTRACT

A self-contained steering, clutch, and brake assembly is provided having a housing for connection to a rotating drive shaft having a drive hub mounted on an extension thereof, a brake hub mounted to the housing, and a clutch drum movable to engage either the drive hub or the brake hub. These engagements are made through coaxial, multi-disk clamping assemblies which serve to increase engagement surface area within the minimal confines of the housing. The clutch drum is constantly connected to a standard size wheel axle through a compound reduction chain drive which is also enclosed by the housing. The clutch drum is normally biased into engagement with the drive hub and a rotary cam actuator is provided to move the clutch hub against the biasing spring and into engagement with the brake hub. The housing is adapted to be bolted directly to the mower deck without special deck reconfiguration.

37 Claims, 4 Drawing Sheets

STEERING CLUTCH BRAKE ASSEMBLY

BACKGROUND AND SUMMARY OF THE INVENTION

The present invention relates generally to drive systems for lawn mowers, and particularly to steering, brake, and clutch assemblies for mowing equipment. More particularly, the present invention relates to a steering clutch brake assembly for use on a walk-behind mower or other grass-cutting device.

Commercial quality walk-behind mowers have typically included a drive motor which is connected to ground-engaging wheels on both sides of the mower by a drive belt linkage. To apply motive force to the wheels, each such linkage would include a tensioning idler pulley. To brake one or more wheels, an actuator, such as a hand lever, would be provided to move the idler pulley out of tension with the drive belt and to move a band brake into engagement with the wheel. Braking one wheel was, for example, used to steer the mower, while braking wheels on both sides of the mower was effective in bringing the mower to a stop.

These prior belt linkages have proven unsatisfactory in certain circumstances. Connecting the drive shaft to the wheel, the idler pulley to the band brake, and the hand lever to the idler pulley required a cumbersome arrangement whose efficiency deteriorated relatively quickly in the field and required a significant amount of maintenance work. In addition, when a single idler pulley was used with each wheel, such prior mowers tended to free wheel off hills and could not be driven in reverse. A double idler pulley arrangement has been used to help solve those concerns, but at the expense of even more linkages and more maintenance work.

Also, in order to maintain an acceptably low level of grip force needed to actuate the hand lever, idler pulley springs have been employed which are too light to maintain optimum tension on the drive belt. As a result, prior mowers have tended to slip when climbing hills or pulling a grass catcher or riding sulky. Further, prior band brakes typically braked the wheel in only one direction and tended to wear out relatively quickly because they are open to the environment and mounted directly to the wheel. To accommodate these band brakes, specially formed and expensive wheel assemblies have been required.

Various prior mower drive systems have been proposed which do not rely on belt linkages. However, for various reasons these alternatives have not been commercially practical. Hydraulic drive systems may function well, but are prohibitively expensive. Prior clutch drive systems have typically lacked an integral brake as well as a final drive, all components remaining exposed to the environment and a belt drive linkage connecting the clutch to the wheel. Other prior clutch drive systems have been relatively bulky, requiring special construction of the mower deck to accommodate it, and not being readily adaptable to existing mower decks.

Accordingly, it is an object of the present invention to provide an improved drive system for mowers. Another object of this invention is to provide an inexpensive and reliable mower drive system that incorporates steering and braking capabilities. Yet another object is to provide a mower drive system that can be easily maintained and repaired and readily fitted to existing mower deck structures.

There is a need for a mower drive assembly that is able to provide greater driving torque to the wheels in forward and reverse directions of drive, with minimal necessary user actuation force. A compact steering, brake, and mower drive assembly whose components are shielded from the work environment and a drive assembly having a greater useful life and utilizable with standard wheel assemblies would also be an improvement over conventional mower drive assemblies.

According to the present invention, a self-contained steering, clutch, and brake assembly is provided for use in a lawn mower. This steering, clutch, and brake assembly includes a housing for connection to a rotating drive shaft. A brake hub is mounted to the housing and a clutch drum is movable between connection with the drive hub or the brake hub. A drive hub is mounted on an extension of the drive shaft. The connections between the clutch drum and the drive or brake hubs are made through floating coaxial multi-disk clamping assemblies which serve to increase engagement surface area within the minimal confines of the housing.

The clutch drum is always connected to a standard-size wheel axle through a compound reduction chain drive which is also enclosed by the housing. The clutch drum is biased normally into engagement with the drive hub. A cam actuator is provided to disengage the clutch drum and drive hub and to move the clutch drum into engagement with the brake hub. The housing is adapted to be bolted directly to the mower deck without special deck reconfiguration.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
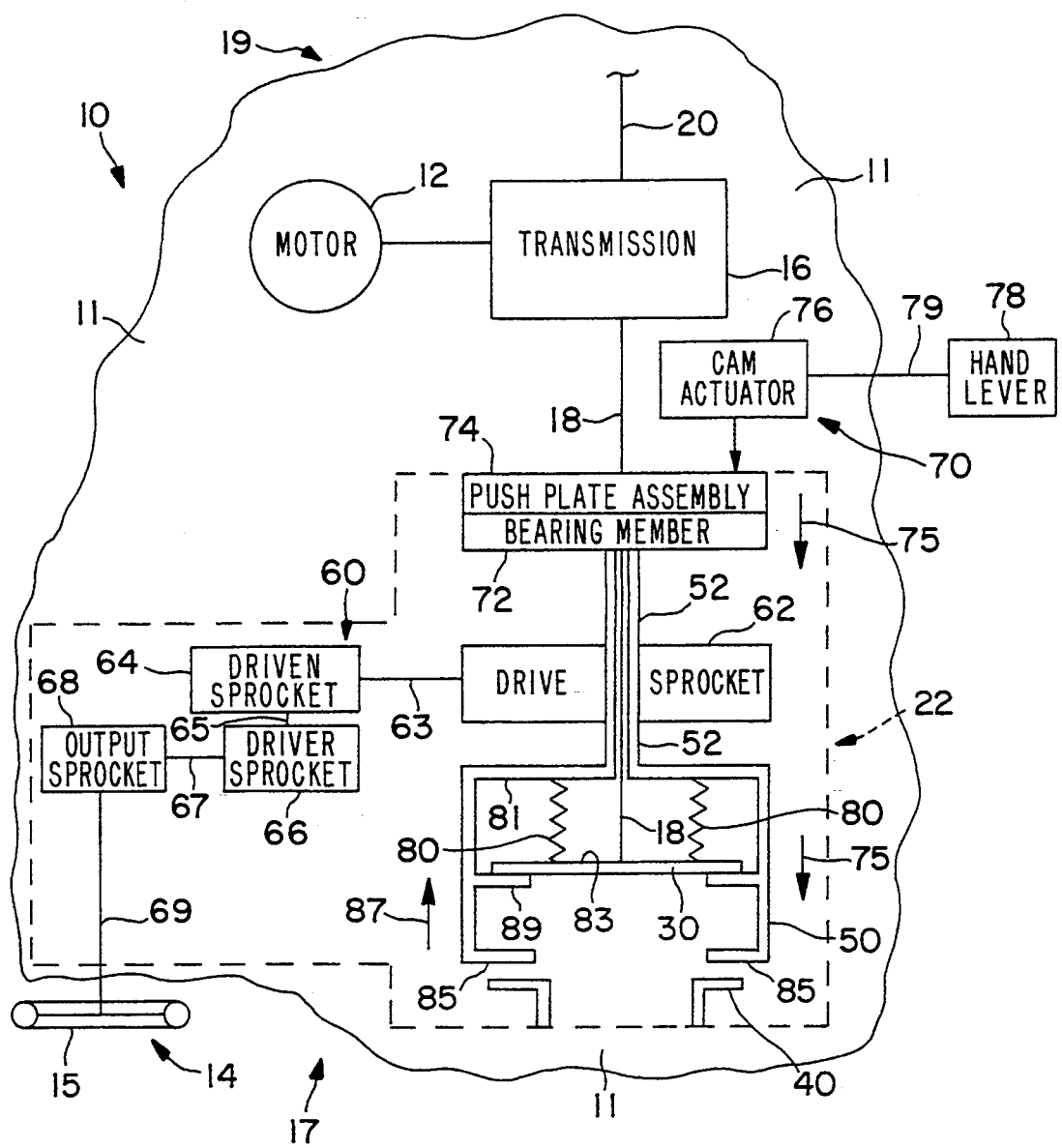
FIG. 1 is a schematic view of a mower drive system according to the present invention.
Figure 2:
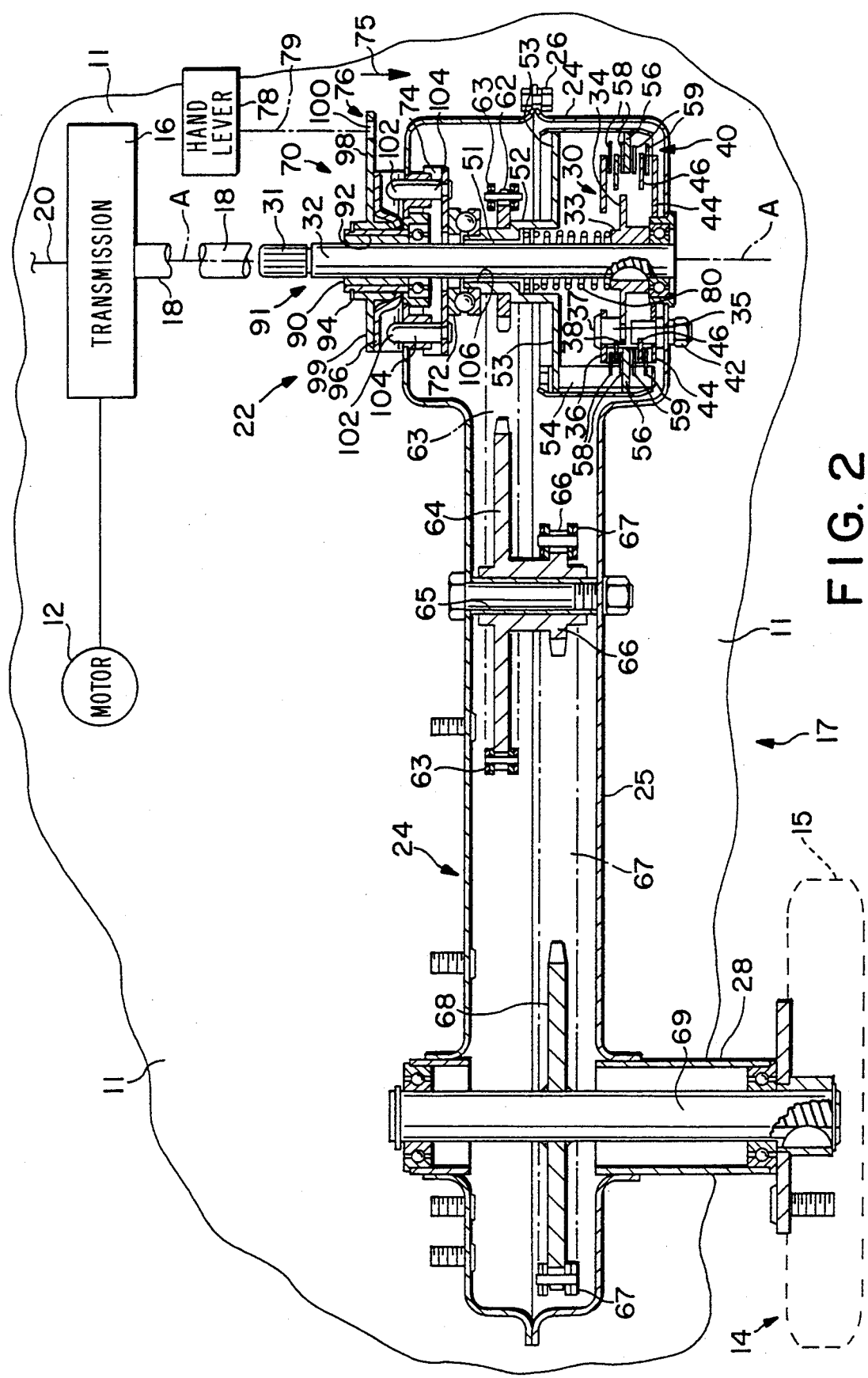
FIG. 2 is a cross-sectional view of steering, clutch, and brake assembly incorporating a preferred embodiment of the present invention.

A general schematic of the present invention as applied to a typical, commercial quality walk-behind mower for cutting grass is shown in FIG. 1. One specific preferred embodiment of the steering, clutch, and brake assembly for such mowers is shown in FIG. 2.

As indicated in FIG. 1, the present invention is preferably mounted on a rear deck 11 of a mower 10. Motor 12 is mounted to mower 10 to provide motive force to the mower components, including the ground-engaging wheels 14 which drive the mower 10. Transmission 16 is connected to motor 12 to provide rotational force to a left-wheel drive shaft 18 and a right-wheel drive shaft 20.

The steering, clutch, and drive assembly 22 of the present invention is typically mounted to the rear deck 11 of mower 10, and one such assembly 22 is connected to each of left-wheel drive shaft 18 and right-wheel drive shaft 20. As shown in FIG. 1, the left-wheel drive shaft 18 is connected to assembly 22 and operable to control rotation of the left-side wheel 15 on mower 10. For ease of illustration, the right-side steering, clutch, and drive assembly connected to right-wheel drive shaft 20 is not shown in FIG. 1, although it will be understood that the right-side assembly corresponds with the assembly 22 shown in connection with left-wheel drive shaft 18.

Assembly 22 includes drive hub 30 connected to horizontal drive shaft 18 or an extension thereof, brake hub 40, clutch drum 50, compound reduction chain idler assembly 60, and actuator assembly 70. Compression spring 80 normally biases clutch disk means 89 of clutch drum 50 into engagement with the drive hub 30 located inside clutch drum 50, thereby imparting rotational force from drive shaft 18 and extension to clutch drum 50. Compound reduction chain idler assembly 60 operates to transfer that rotational force to left-side wheel 15. Actuator assembly 70 can be used by a lawn mower operator in the manner described below to overcome the biasing of spring 80 so as to disengage clutch drum 50 from the rotating drive hub 30 and cause clutch drum 50 instead to engage brake hub 40.

FIG. 1 is a diagrammatic layout of the steering, clutch, and brake assembly 22 showing how the assembly 22 is configured and operated. The compression spring 80 is arranged and sized normally to move the clutch drum 50 into engagement with the drive hub 30 as shown in FIG. 1 to establish a driving connection from the transmission 16 to the left-side wheel 15 through the idler assembly 60. To disengage the clutch and engage the brake, an operator pushing the lawn mower actuates the hand-operated steering lever 78 which rotates the cam actuator 76 to move the push-plate assembly 74 and ball-thrust bearing assembly 72 horizontally in direction 75 against the clutch drum stem 52 so that the clutch drum 50 is moved away from engagement with the drive hub 30 (also in horizontal direction 75) and against the compression spring 80 located between the top wall 81 of clutch drum 50 and a top surface 83 of drive hub 30 to engage the brake hub 40. As shown in FIG. 1, brake hub 40 underlies a bottom wall or brake disk means 85 of clutch drum 50. At this point, the driving connection between the transmission 16 and the left-side wheel 15 through the idler sprocket assembly 60 is disengaged and the left-side wheel 15 is braked.

One of these steering, clutch, and brake assemblies 22 is positioned on each side of the mower deck 11 so that one assembly controls the left-side wheel and the other assembly controls the right-side wheel. Both assemblies are connected to the transmission 16 which is mounted on the rear mower deck 11 between the left-side and right-side wheels.

In typical mowers, horizontal drive shafts 18 and 20 will be constantly rotating in either a forward or reverse direction when motor 12 is in operation and transmission 16 is in gear. Thus, when actuator assembly 70 is operated to cause clutch drum 50 to move to engage brake hub 40, left-side wheel 15 will stop rotating on the left side 17 of mower 10. If the actuator assembly on the right side 19 of mower 10 is not similarly operated, the right-side wheel (not shown) on the right side 19 of mower 10 will continue to rotate, and the mower 10 will turn to the left if the right-side wheel rotates forward and turn to the right if the right-side wheel rotates in reverse. If the actuator assembly on the right side of mower 10 is similarly operated, both left-side and right-side wheels will cease rotating, and mower 10 will stop its motion in either direction. Forward or reverse rotation of the left-side and right-side wheels is determined by transmission 16 since it applies forward or reverse rotation to drive shafts 18 and 20 and controls the speed of rotation of those shafts 18, 20 according to the usual methods.

Compound reduction chain idler assembly 60 includes a small drive sprocket 62 fixedly mounted on clutch drive stem 52 attached to clutch drum 50 and a large, driven sprocket 64 connected to sprocket 62 by drive chain 63. A second small driver sprocket 66 is fixedly mounted to sprocket 64, and both of those sprockets 64, 66 rotate about axle 65. A second large, driven sprocket 68 is connected to sprocket 66 by drive chain 67 and is fixedly mounted on left-side wheel axle 69. The ratio of large to small sprocket sizes can be established in the usual manner to achieve whatever torque and driving speeds are desired for left-side wheel 15. In especially preferred embodiments of the present invention, that ratio is 8.53:1.00.

Actuator assembly 70 includes ball thrust bearing member 72 in contact with the clutch drive stem 52 appended to clutch drum 50, push plate assembly 74, rotary cam actuator 76, and hand drum lever 78. Hand lever 78 is connected to rotary cam actuator 76 via control rod 79. When hand lever 78 is operated, cam actuator 76 operates to cause push plate assembly 74 to force ball thrust bearing member 72 and clutch drive stem 52 toward brake hub 40 in a horizontal direction 75 in a manner which moves clutch drum 50 to overcome the biasing force of spring 80. As push plate assembly 74 applies further force, clutch drum 50 is disengaged from drive hub 30 and urged in horizontal direction 75 into engagement with brake hub 40. When hand lever 78 is released, spring 80 forces clutch drum 50 back in opposite horizontal direction 87 into engagement with drive hub 30. Hand lever 78 can be locked into its operated position in a conventional manner to provide a parking brake for mower 10. Preferably, the components of the present invention, such as spring 80, are selected to allow hand lever 78 to be operated by approximately 10–12 pounds force of pressure at the handle.

The steering, clutch, and brake assembly 22 was designed to provide makers of commercial quality wide-area walk-behind mowers with a reliable wheel drive, steering, and braking system. It has been developed in such a way that it is readily adaptable to most current designs without adversely affecting cost and yields important performance and safety features to the product. Mowers 10 are equipped with a clutch/brake unit on each wheel, driven by a common transmission 16 which provides a range of different ground speeds. Conveniently, the transmission 16 is located in the center of the rear mower deck 11 and clutch/brake units 22 are bolted to both sides of the mower 10 and extend down to the wheels 14.

Power is transferred from the output shaft of the transmission 16 to the input shaft of the clutch/brake through a splined coupling. Any time that the transmission 16 is in gear, the input shafts of both clutch/brake assemblies run at the same selected speed. Since these are normally engaged clutches, both wheels are driven at equal speed, causing the machine to run in a straight line. If the operator chooses to make a turn, then the clutch for that side (left turn/left clutch) is disengaged by squeezing a hand control 78. This simultaneously applies a brake of gradient capacity which can be modulated by the operator to make sharp or more gradual turns. If both grips are squeezed fully at the same time, the machine will stop in a straight line. If the hand grips are locked in the squeezed position, then the units act as parking brakes.

With reference to FIG. 2, steering, clutch, and drive assembly 22 includes a clam-shell type housing 24 having two halves secured together by fasteners 26. Either or both of those halves can be provided with studs for attachment to the frame or deck 11 of mower 10. Both halves are preferably provided with bosses to support bearings for the cross shafts and axles of the assembly 22. The outermost half 25 has, for example, an axle stub housing 28 whose length can be varied to accommodate mowers of different track widths.

Figure 3:
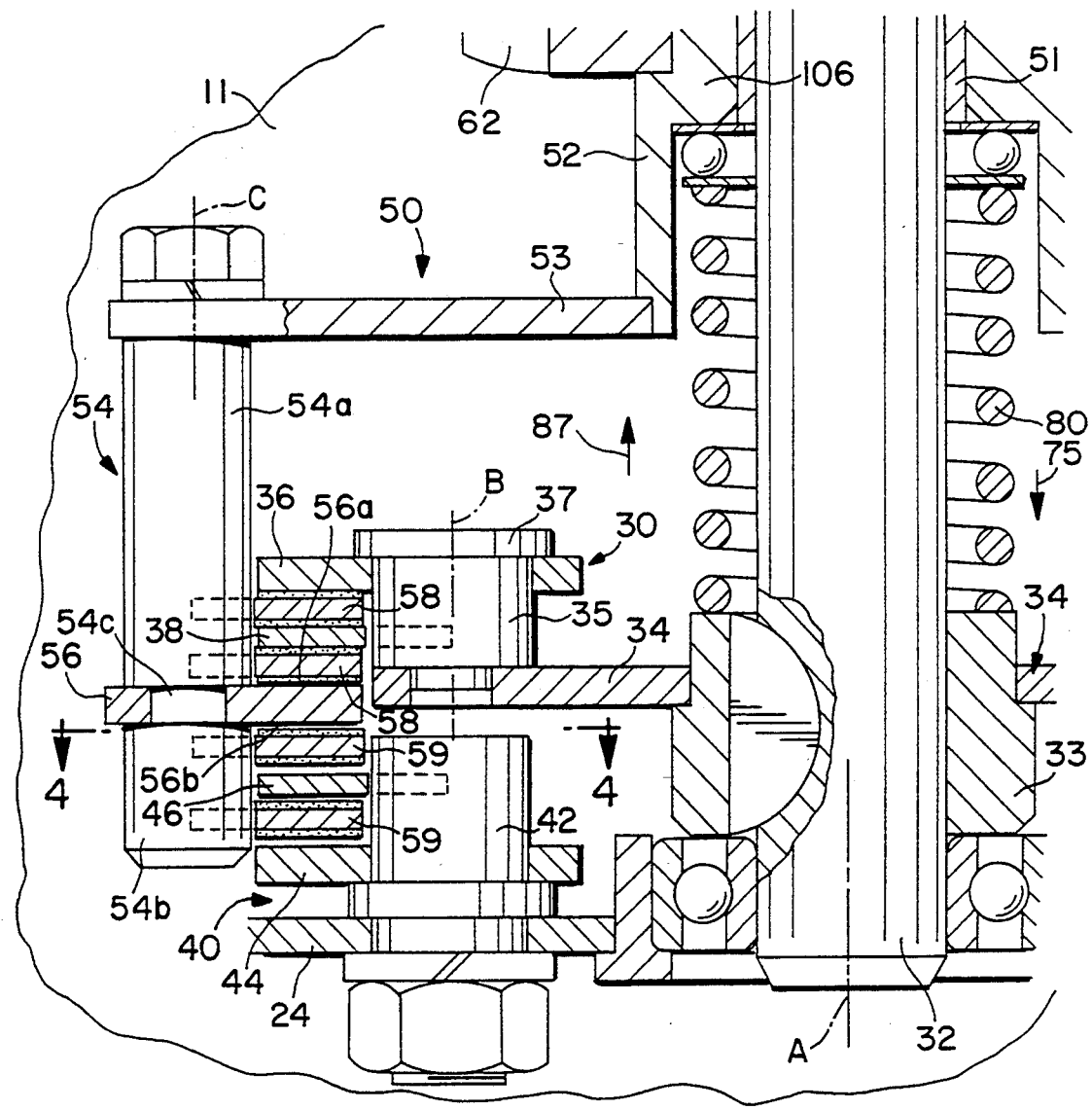
FIG. 3 is an enlarged dead section view of a portion of the steering, clutch, and brake assembly illustrated in FIG. 2 showing the assembly in its normal clutch-engaged position.

Assembly 22 is preferably connected to horizontal drive shaft 18 via input shaft or drive rod 32 having a splined coupling 31 at the exposed end thereof. This form of connection is especially appropriate where assembly 22 is mounted as a preassembled and separable unit to mower 10. Alternatively, if assembly 22 is integrally constructed with the rest of mower 10, drive shaft 18 could extend directly into housing 24, avoiding the need for and advantages of the splined coupling. Drive hub 30 includes flange 34, which is fixedly mounted to drive rod 32 by keyed hub 33 within housing 24 as shown in FIGS. 2 and 3. Flange 34 preferably has three equally spaced fingers which project radially outward from drive rod 32. A driving lug 35 is mounted on the end portion of each of those fingers 34 and, for example, extends parallel to longitudinal axis A of drive rod 32 along longitudinal axis B as shown in FIG. 3. Back-up ring or disk element 36 is mounted on driving lugs 35 and held in place by an enlarged head 37 of each driving lug 35. Clutch separator plate or disk element 38 is also mounted on driving lugs 35, but is free to "float" and move along axis B between flange 34 and back-up ring 36. When drive rod 32 rotates about axis A, both disk elements 36 and 38 rotate with it because of the connection established by driving lugs 35, flange 34, and keyed hub 33.

Figure 5:
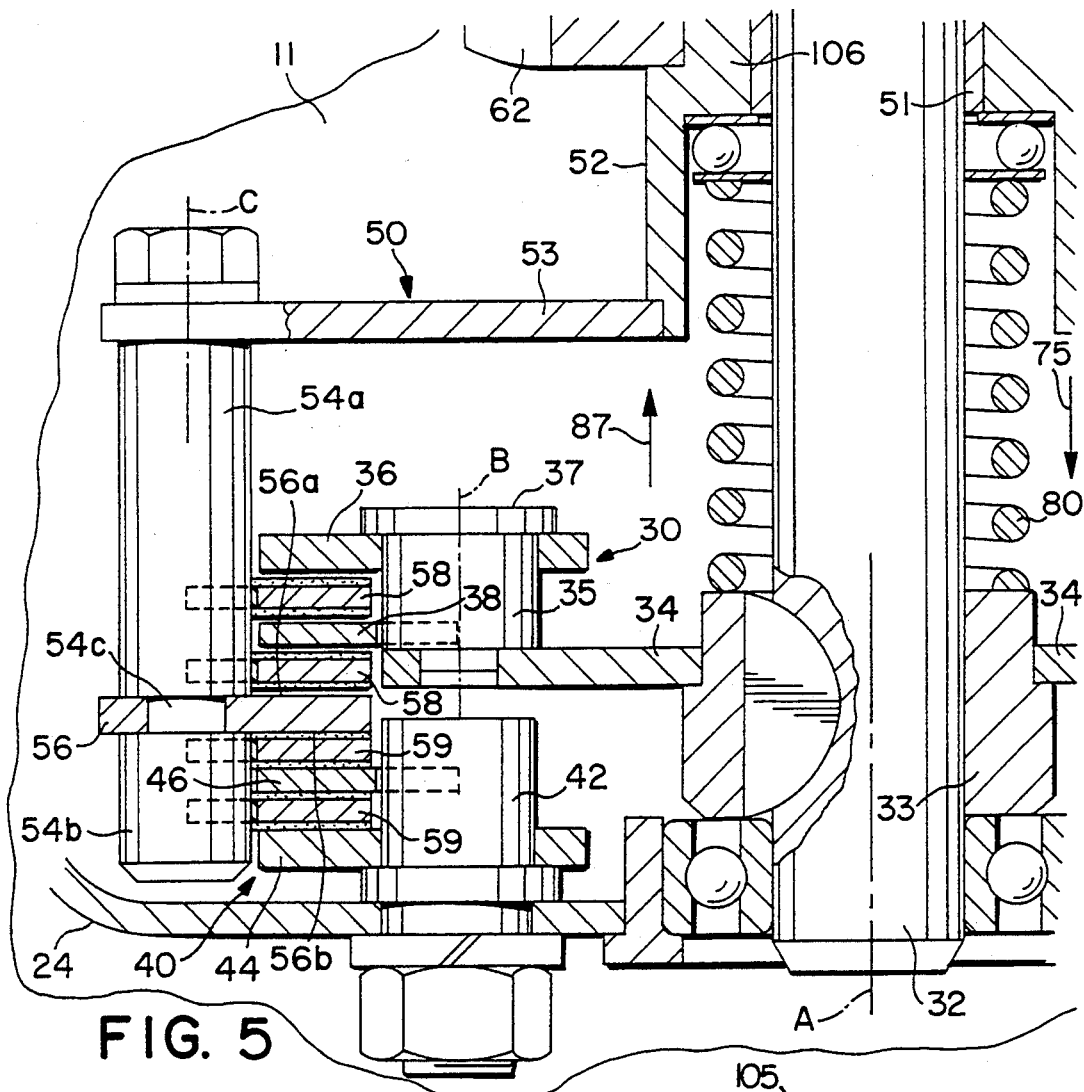
FIG. 5 is a view similar to FIG. 3 showing the assembly after it has been moved to its brake-engaged position using the lever-actuated rotary cam actuator.

Brake hub 40 is, for example, fixedly mounted to housing 24 via a plurality of spaced apart brake lugs 42. Preferably, the number and spacing of these brake lugs 42 corresponds with the number and spacing of driving lugs 35. Brake back-up ring or disk element 44 is attached to brake lugs 42 in a manner which precludes its rotation and longitudinal motion with respect to axis A as shown in FIGS. 3 and 5. Brake separator plate or disk element 46 is also non-rotatably mounted on brake lugs 42, but is free to "float" and move longitudinally on brake lug 42 with respect to axis B.

Clutch drum 50 is preferably mounted for rotation on drive rod 32 and arranged to lie within housing 24 as shown in FIGS. 2, 3, and 5. Clutch drive stem 52 is provided which is, for example, supported on drive rod 32 by "oilite" bushings 51 which allow those two components to rotate independently of one another. Plate 53 is fixed to clutch drive stem 52 and extends radially outward therefrom. A plurality of clutch lugs 54 are provided on plate 53, preferably corresponding in number and spacing to the number and spacing of driving lugs 35. Each clutch lug 54 is, for example, formed from sleeved bolts and arranged to extend along axis C and lie generally parallel to axis A. Brake plate or disk element 56 is mounted to clutch lugs 54 in a manner which precludes longitudinal or rotational movement with respect to those clutch lugs 54. For example, as shown in FIGS. 3 and 5, clutch lug 54 includes a bolt 54c with two sleeves 54a and 54b mounted over that bolt. Brake plate 56 is mounted on the bolt 54c between those two sleeves 54a and 54b. It will be understood that the right side wall 56a of brake plate 56 functions as "clutch disk means" 89 for clutch drum 50 and the left side wall 56b of brake plate 56 functions as "brake disk means" 85 for the clutch drum 50.

Figure 4:
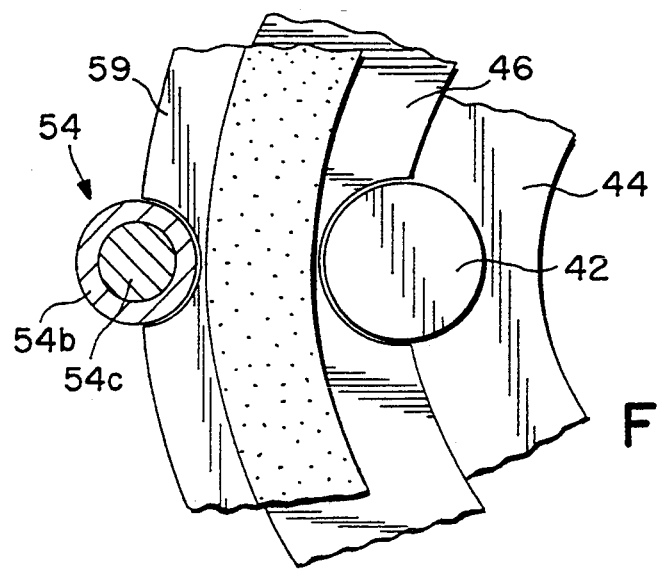
FIG. 4 is a view taken along line 4—4 of FIG. 3 showing a floating friction plate engaging one of the radially outer clutch lugs, the floating brake separator plate engaging one of the radially inner brake lugs 42, and the fixed brake back-up ring mounted on the brake lug.

At least one, and preferably two, floating friction plates or disk elements 58, 59 are mounted on clutch lugs 54 on either side of brake plate 56. These friction plates 58, 59 are slidable along clutch lugs 54 in the direction of axis C, but are not rotatable with respect to clutch lugs 54. As shown in FIGS. 3 and 5, friction plates 58 are mounted on one side of brake plate 56, and two floating friction plates 59 are mounted on the other side of brake plate 56. These floating friction plates 58, 59 are also disposed on either side of separator plates 38 and 46, respectively, as shown in FIGS. 3 and 5. One of friction plates 58 is disposed between back-up ring 36 and clutch separator plate 38, and one of friction plates 59 is disposed between brake back-up ring 44 and brake separator plate 46. Friction plates 58 and 59 are formed with a layer of dry friction material having a coefficient of friction of about 0.40 to 0.45 on each side thereof as shown best in FIGS. 3–5.

In operation, as shown best in FIGS. 1–3, spring 80 normally forces brake plate 56 in horizontal direction 87 toward back-up ring 36. This causes the brake plate 56 to move to clamp the otherwise floating friction plates 58 and the clutch separator plate 38 between the brake plate 56 and the back-up ring 36. This clamped, sandwiched arrangement of coaxially aligned disk elements 56, 58, 48, 58, 36 operates to transfer rotational force and driving torque to clutch drum 50 from the drive rod 32 and the driving lugs 35 rotating with drive rod 32. Torque is increased and speed is reduced by compound reduction chain idler assembly 60. Wheel axle 69 is selected to receive any desired conventional wheel 15 and impart driving rotation thereto. As shown best in FIG. 3, the brake is not engaged when the clutch is engaged.

Figures 6, 7:
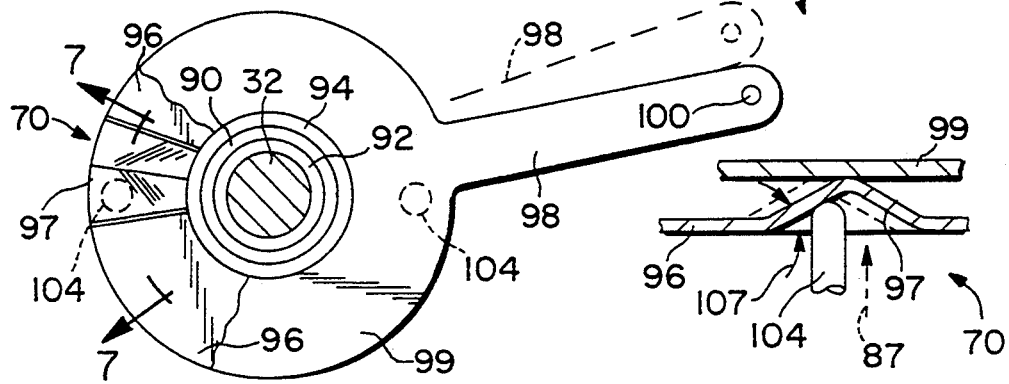
FIG. 6 is a top plan view of the lever-actuated rotary cam actuator illustrated in FIG. 2 showing the lever in its normal clutch-engaged position (phantom lines) and in its brake-actuated position (solid lines) with a portion broken away showing the cam plate underneath the lever arm disk.
FIG. 7 is a sectional view taken along arcuate line 7—7 of FIG. 6 showing a V-shaped portion of the cam plate engaging an underlying upright cam follower pin included in the push-plate assembly.

Mounted coaxially to the input shaft bearing boss 90 is a cylindrical hub 92 which projects from the input side 91 of the housing 24 as shown in FIGS. 2 and 6. On this hub 92 is mounted a rotary face cam-type actuator assembly 70. The actuator assembly 70 is comprised of three parts which are welded or brazed together. They consist of a center hub 94 which is free to rotate on the outside of the bearing boss 90, a cam plate 96 which is a disk with a smooth inner diameter and outer diameter with two "V" groove indentions 97 (see FIG. 7) stamped in the face of the part equally spaced, an actuator arm assembly which is a flat disk 99 with an arm 98 that projects radially. As shown in FIG. 7, an angle 107 of about 30° is used to define the slope of the "V" groove indentation. In the arm is a hole 100 which provides a place to fasten the control rod 79 from the operator steering handle 78.

When the steering lever 78 is squeezed by the operator, it causes the actuator cam assembly 70 to rotate in direction 105 on the hub 92 through an angle of about 8° as shown, for example, in FIG. 6. As the "V" grooves 97 of the cam plate 96 rotate, they press axially against a cam follower assembly including the spherical ends 102 of the pins 104 in the push plate assembly 74. This causes movement of the push plate 74 horizontally in direction 75 which pushes against a ball thrust bearing 72 which in turn pushes against the end 106 of the clutch drum 50. As the clutch drum 50 moves axially away from the cam plate 96 in direction 75, a gap is created between the drive side of the brake ring, the drive friction disks, the separator plate, and the back-up ring of the drive hub 30 as shown in FIG. 5. This causes a declutching action to occur between the drive hub 30 and the clutch drum 50.

If the action of the cam plate 96 is continued, the clutch drum 50 travels further in horizontal direction 75 until it squeezes the sandwiched brake friction disks 59 and brake separator plate 46 between the brake side of the brake ring 56 and the brake back-up ring 44 which is secured to the stationary case 24 by three cylindrical brake lugs 42. Energy from the wheel is back-fed through the clutch drum 50 into the disks and dissipated through the case 24. When actuator assembly 70 causes clutch hub 50 to engage brake hub 40, brake separator plate 46 is clamped between friction disks 59 and one of friction disks 59 is clamped between brake back-up ring 44 and separator plate 46. This sandwiched arrangement of the disk elements transfers rotational energy from clutch hub 50 to brake hub 40 for dissipation through housing 24. When the hand control 78 is released, the cam plate 96 returns to its normal position, the spring 80 reengages the drive plates 56, 36, and the machine resumes normal travel.

Although the invention has been described in detail with reference to certain preferred embodiments, variations and modifications exist within the scope and spirit of the invention as described and defined in the following claims.

What is claimed is:

1. A steering, clutch, and brake assembly comprising
   a hollow clutch drum including clutch disk means and brake disk means located within the hollow of the hollow clutch drum,
   a clutch hub positioned for movement within the hollow of the clutch drum,
   spring means located within the hollow of the clutch drum for normally urging the clutch disk means of the clutch drum into clutching engagement with the clutch hub,
   a brake hub fixed to lie in spaced-apart relation to the brake disk means during clutching engagement of the clutch disk means of the clutch drum and the clutch hub, and
   means for moving the clutch drum against the spring means to disengage the clutch disk means of the clutch drum and the clutch hub and engage the brake disk means of the clutch drum and the brake hub.

2. The assembly of claim 1, further comprising a drive sprocket mounted on the clutch drum for movement therewith and connected to an output shaft through speed reduction mechanism during clutching engagement of the clutch hub and the clutch disk means of the clutch drum.

3. The assembly of claim 2, wherein the clutch drum includes a top wall formed to include an aperture and the mounting means includes a tubular sleeve appended to the top wall of the clutch drum and having a longitudinally extending passageway therethrough communicating with the aperture.

4. The assembly of claim 3, further comprising means for rotating the clutch hub relative to the fixed brake hub, the rotating means including a shaft extending through the longitudinally extending passageway formed in the tubular sleeve to engage the clutch hub.

5. The apparatus of claim 1 wherein the brake hub is located within the hollow of the hollow clutch drum.

6. A steering clutch, and brake assembly comprising
   a hollow clutch drum including clutch disk means and brake disk means,
   a clutch hub positioned for movement inside the hollow clutch drum,
   spring means inside the hollow clutch drum for normally urging the clutch disk means of the clutch drum into clutching engagement with the clutch hub,
   a brake hub fixed to lie in spaced-apart relation to the brake disk means during clutching engagement of the clutch disk means of the clutch drum and the clutch hub,
   means for moving the clutch drum against the spring means to disengage the clutch disk means of the clutch drum and the clutch hub and engage the brake disk means of the clutch drum and the brake hub and
   wherein the spring means engages the top wall of the clutch drum and the clutch hub.

7. A steering, clutch and brake assembly comprising
   a hollow clutch drum including clutch disk means and brake disk means,
   a clutch hub positioned for movement inside the hollow clutch drum,
   spring means inside the hollow clutch drum for normally urging the clutch disk means of the clutch drum into clutching engagement with the clutch hub,
   a brake hub fixed to lie in spaced-apart relation to the brake disk means during clutching engagement of the clutch disk means of the clutch drum and the clutch hub,
   means for moving the clutch drum against the spring means to disengage the clutch disk means of the clutch drum and the clutch hub and engage the brake disk means of the clutch drum add the brake hub, and
   wherein the clutch drum includes a top wall formed to include a central aperture, and further comprising means extending through the central aperture for rotating the clutch hub relative to the brake hub, 8. The assembly of claim 7, wherein the rotating means includes a rotatable shaft and the spring means includes a coiled spring engaging the top wall and the clutch disk means and winding around the rotatable shaft.

9. A steering, clutch, and brake assembly comprising:
a hollow clutch drum including clutch disk means and brake disk means,
a clutch hub positioned for movement inside the hollow clutch drum,
spring means inside the hollow clutch drum for normally urging the clutch disk means of the clutch drum into clutching engagement with the clutch hub,
a brake hub fixed to lie in spaced-apart relation to the brake disk means during clutching engagement of the clutch disk means of the clutch drum and the clutch hub,
means for moving the clutch drum against the spring means to disengage the clutch disk means of the clutch drum and the clutch hub and engage the brake disk means of the clutch drum and the brake hub, and
the moving means including a cam follower appended to the clutch drum and cam means for pushing the cam follower toward the brake hub to disengage the clutch disk means and the clutch hub and engage the brake disk means and the brake hub.

10. The assembly of claim 9, wherein the cam follower includes a push plate assembly having a plate and a pair of upstanding pins mounted on the plate, a drive stem appended to the clutch drum, and a bearing lying between the plate and the drive stem.

11. The assembly of claim 10, wherein the cam means includes a rotatable plate having a lever arm and a camming face engaging a distal end of each of the upstanding pins mounted on the plate.

12. The assembly of claim 9, wherein the cam means includes a cam plate formed to include a mounting surface facing away from the cam follower and a contoured cam surface engaging the cam follower and an actuator arm assembly having a disk engaging the mounting surface of the cam plate and a radially outwardly projecting arm appended to the disk.

13. The assembly of claim 12, further comprising a rotatable drive shaft for rotating the clutch hub, the cam plate being formed to include an aperture receiving the rotatable drive shaft, and the disk being formed to include another aperture receiving the rotatable drive shaft.

14. The assembly of claim 13, wherein the actuator arm assembly further includes a center hub formed to include a central passageway receiving the rotatable drive shaft therein and positioned to lie in the aperture formed in the disk 15. The assembly of claim 9, wherein the cam follower includes a push plate assembly having a push plate and at least one upstanding pin mounted on the push plate and arranged to engage the cam means.

16. The assembly of claim 15, further comprising a rotatable drive shaft for rotating the clutch hub, the push plate being formed to include an aperture receiving the rotatable drive shaft, and the at least one pin being oriented to lie in spaced-apart parallel relation to the rotatable drive shaft.

17. The assembly of claim 16, wherein the cam follower further includes a drive stem appended to the clutch drum and formed to include a passageway receiving the rotatable drive shaft and a bearing lying between the push plate and the drive stem and having a central aperture receiving the rotatable drive shaft.

18. An apparatus for cutting grass, the apparatus comprising
at least one ground-engaging element,
drive means for providing motive force to parts of said apparatus, and
coupling means for selectively connecting said drive means to said ground-engaging element, said coupling means including a clutch member which is biased toward connection with said drive means, a brake member for restricting motion of said ground-engaging means, and an actuating assembly for selectively causing said clutch member to disconnect from said drive means and thereafter connect with said brake member, said actuating assembly including a cam follower appended to the clutch member and cam means for pushing the cam follower to disconnect the clutch member and the drive means and connect the brake member and the drive means.

19. The apparatus of claim 18, wherein said clutch member includes first clamping means for engaging a portion of said drive means between at least two opposing surfaces to effect said connection with said drive means and second clamping means for engaging a portion of said brake member between at least two opposing surfaces to effect connection of said clutch member with said brake member.

20. The apparatus of claim 18, wherein the cam follower is positioned to lie between the cam means and the brake hub.

21. The apparatus of claim 18, wherein the cam follower includes a push plate assembly having a push plate and at least one upstanding pin mounted on the push plate and arranged to engage the cam means.

22. The apparatus of claim 21, wherein the cam follower further includes a drive stem appended to the clutch member and a bearing lying between the push plate and the drive stem.

23. The assembly of claim 21, wherein said clutch member is coaxially mounted about said drive rod member, sharing a common rotational axis, and wherein with respect to said disk elements said clutch member, drive shaft member, and brake member each include a first disk element which is fixed thereto and a second disk element which is movable along said common rotational axis.

24. The assembly of claim 23, wherein said disk elements are disposed with respect to each other such that when said drive rod member and clutch member are in engagement the second disk element of each of those members is clamped between opposing surfaces of other disk elements.

25. The apparatus of claim 18, wherein the cam means includes a cam plate formed to include a mounting surface facing away from the cam follower and a contoured cam surface engaging the cam follower and an actuator arm assembly having a disk engaging the mounting surface of the cam plate and a radially outwardly projecting arm appended to the disk.

26. A self-contained steering, clutch, and brake assembly, the assembly comprising
a housing,
a rotatable drive rod member received within said housing and extending outwardly therefrom for connection with a source of rotational force, a rotatable clutch member within said housing,
a first sprocket connected to said clutch member and rotatable therewith,
at least a second, larger rotatable sprocket spaced apart from said first sprocket within said housing,
a drive chain assembly connected between said first and second sprockets,
a wheel axle connected to said second sprocket and rotatable therewith, said wheel axle extending outwardly from said housing for connection with a ground-engaging element,
a brake member disposed within said housing for restricting rotation of said wheel axle, and
actuator means for selectively placing said clutch member into engagement with one of said drive rod members and said brake member, the actuator means including a cam follower appended to the clutch member and cam means for pushing the cam follower to disengage the clutch member and the drive rod member and engage the brake member and the drive rod member.

27. The assembly of claim 26, wherein said drive chain assembly includes a third, larger rotatable sprocket spaced apart from said first sprocket within said housing and connected to said first sprocket by a first drive chain, and a fourth rotatable sprocket coaxially aligned with said third sprocket along the rotational axis of said third sprocket and smaller in size than either of said second or third sprockets, said second and fourth sprockets being connected by a second drive chain.

28. The assembly of claim 26, further comprising biasing means for applying force to said clutch member to urge said clutch member toward engagement with said drive rod member, and said actuator means transfers actuation force applied outside of said housing to said clutch member to overcome the force applied thereto by said biasing means and urge said clutch means toward engagement with said brake member.

29. The apparatus of claim wherein the clutch member, drive rod member, and brake member each include a plurality of disk elements and the disk elements are coaxially aligned and interchangeable according to the selection of the actuator means.

30. A steering, clutch, and brake assembly comprising
a hollow clutch drum including clutch disk means and brake disk means,
a clutch hub positioned for movement inside the hollow clutch drum,
spring means inside the hollow clutch drum for normally urging the clutch disk means of the clutch drum into clutching engagement with the clutch hub,
a brake hub fixed to lie in spaced-apart relation to the brake disk means during clutching engagement of the clutch disk means of the clutch drum and the clutch hub, and
means for moving the clutch drum against the spring means to disengage the clutch disk means of the clutch drum and the clutch hub and engage the brake disk means of the clutch drum and the brake hub,
a drive sprocket mounted on an external surface of the clutch drum for movement therewith and connected to drive an output shaft through a speed reduction mechanism during clutching engagement of the clutch hub and the clutch disk means of the clutch drum, 31. The assembly of claim 30 wherein the clutch drum includes a top wall formed to include an aperture and the mounting means includes a tubular sleeve appended to the top wall of the clutch drum and having a longitudinally extending passageway therethrough communicating with the aperture.

32. The assembly of claim 31, wherein the spring means engages the top wall of the clutch drum and the clutch hub.

33. The assembly of claim 31, further comprising means for rotating the clutch hub relative to the fixed brake hub, the rotating means including a shaft extending through the longitudinally extending passageway formed in the tubular sleeve to engage the clutch hub.

34. A steering, clutch, and brake assembly comprising
a hollow clutch drum including clutch disk means and brake disk means,
a clutch hub positioned for movement inside the hollow clutch drum,
spring means located inside the hollow clutch drum and extending between the clutch hub and the clutch drum for normally urging the clutch disk means of the clutch drum into clutching engagement with the clutch hub,
a brake hub fixed to lie in spaced-apart relation to the brake disk means during clutching engagement of the clutch disk means of the clutch drum and the clutch hub, and
means for moving the clutch drum against the spring means to disengage the clutch disk means of the clutch drum and the clutch drum and engage the brake disk means of the clutch drum and the brake hub.

35. The assembly of claim 34, further comprising a drive sprocket, and
means for mounting the drive sprocket on the clutch drum for movement therewith and connected to drive an output shaft through a speed reduction mechanism during clutching engagement of the clutch hub and the clutch disk means of the clutch drum.

36. The assembly of claim 34, wherein the clutch drum includes a top wall formed to include an aperture and the mounting means includes a tubular sleeve appended to the top wall of the clutch drum and having a longitudinally extending passageway therethrough communicating with the aperture.

37. The assembly of claim 36, further comprising means for rotating the clutch hub relative to the fixed brake hub, the rotating means including a shaft extending through the longitudinally extending passageway formed in the tubular sleeve to engage the clutch hub.

* * * * *